United States Patent [19]

Johnson et al.

[11] 3,910,354

[45] Oct. 7, 1975

[54] TOGGLE TRIP FOR MOLDBOARD PLOW

[75] Inventors: Otto E. Johnson, Hinsdale; Gerald G. Ward, Naperville, both of Ill.

[73] Assignee: International Harvester Company, Chicago, Ill.

[22] Filed: July 26, 1974

[21] Appl. No.: 491,977

[52] U.S. Cl. ............ 172/267; 116/124 A; 172/711; 403/79; 403/157
[51] Int. Cl.² .................... A01B 61/04; A01B 15/02
[58] Field of Search ............................ 172/266–268, 172/261, 269, 264, 265, 710, 711, 705, 708; 116/124 A; 403/79, 157; 267/136, 158

[56] References Cited

UNITED STATES PATENTS

| | | | |
|---|---|---|---|
| 158,081 | 12/1874 | Hewett | 172/267 |
| 264,319 | 9/1882 | Mendenhall | 172/267 |
| 316,387 | 4/1885 | Patric | 172/268 |
| 358,013 | 2/1887 | Brown et al. | 172/711 X |
| 363,757 | 5/1887 | Noxon et al. | 172/266 |
| 367,623 | 8/1887 | Hartman | 172/268 |
| 530,819 | 12/1894 | Baker | 172/267 |
| 545,987 | 9/1895 | Van Brunt | 172/267 |
| 634,558 | 10/1899 | Harless | 172/267 |
| 848,115 | 3/1907 | Merrill | 172/267 |
| 895,587 | 8/1908 | Putney | 172/267 |
| 1,210,901 | 1/1917 | Carraway | 172/266 |
| 1,900,440 | 3/1933 | Ferguson | 172/268 |
| 3,049,180 | 8/1962 | Shader et al. | 172/268 |
| 3,483,930 | 12/1969 | Detwiller et al. | 172/266 X |
| 3,765,492 | 10/1973 | Irwin | 172/266 |

FOREIGN PATENTS OR APPLICATIONS

| | | | |
|---|---|---|---|
| 225,500 | 6/1925 | United Kingdom | 172/710 |
| 110,020 | 3/1940 | Australia | 172/705 |
| 782,876 | 9/1957 | United Kingdom | 172/266 |

*Primary Examiner*—Clifford D. Crowder
*Assistant Examiner*—Steven A. Bratlie
*Attorney, Agent, or Firm*—F. David AuBuchon; Floyd B. Harman

[57] ABSTRACT

An over-center toggle mounting for a moldboard plow unit embodying a spring trip mechanism having a pair of rigid toggle elements one of which is pivoted to the plow shank and the other of which is pivoted to a leaf spring on the plow frame. Cooperating abutment stops effective between one of the toggle elements and the plow frame determine the over-center position of the toggle arrangement, and consequently the normal operating earthworking position of the plow unit. The principle function of these abutment stops is to provide a pivot fulcrum to cause the toggle to release from its over-center position when the leaf spring flexes downward and forward. Rearward pressure against the plow unit results in compression and forward endwise shifting of the rigid over-center toggle arrangement, thus flexing the leaf spring in direct proportion to the magnitude of the applied plow pressure. When such pressure exeeds a predetermined maximum, the leaf spring is flexed to such a degree that the over-center condition of the toggle arrangement is positively relieved, the mechanism is tripped and the plow unit is released from its earthworking position for rearward and upward displacement incident to forward movement of the plow frame. In a modified form of the spring trip mechanism, the leaf spring is replaced by a compression spring. In either form, restoration of the plow unit to its earthworking position may be accomplished by raising the plow frame or by reversing the direction of plow movement.

22 Claims, 8 Drawing Figures

TOGGLE TRIP FOR MOLDBOARD PLOW

SPECIFICATION

The present invention relates to earthworking implements and has particular reference to a novel spring biased over-center toggle mounting which normally maintains an earthworking tool such as a moldboard plow unit in its operative position but which, when the tool encounters an obstruction, positively trips the over-center toggle mounting to an off-center position, thus releasing the plow unit for rearward and upward displacement incident to continued forward movement of the implement.

There are currently in use a wide variety of release arrangements for moldboard plow units and other earthworking tools. The most common of these arrangements employ plow beams that swing release about a low pivot point, employing spring loaded rollers held in a notch. Others are spring toggle release devices which also tend to be sensitive to friction and are spring sensitive. For showings of release arrangements of this type reference is made to U.S. Pat. No. 3,022,835 of Feb. 27, 1962 and U.S. Pat. 2,850,957 of Sept. 9, 1958. Still other plow release arrangements employ shear bolts but these possess the obvious disadvantage that, although they are inexpensive, in actual practice, shear bolts vary widely in their shear resistance. Still further, the shear bolts are expendable and require replacement after each plow tripping operation.

The present invention is designed to overcome the above-noted limitations that are attendant upon the construction and use of such conventional plow release arrangements and, toward this end, the invention contemplates the provision of a novel over-center toggle arrangement embodying a pair of rigid toggle elements including a forward element which is connected at its outer end to a flexible leaf spring carried by the plow frame, and a rear element which is connected at its outer end to the shank of a plow unit, such shank being effectively pivoted to the plow frame so that it may swing in opposite directions, either to maintain the plow unit in its lowered operative earthworking position or to withdraw the plow unit upwardly from such operative position. Cooperating abutments or stops are effective between the foward toggle element and plow frame to determine the over-center position of the former and maintain the plow unit in its operative lowered position. Normal rearward pressure on the plow unit as the implement travels forwardly will place the over-center toggle arrangement under moderate compression endwise, shifting the same bodily endwise and downward and flexing of the leaf spring proportionately at this pressure increases or decreases but without, greatly altering the over-center condition of the toggle elements. However, when an excess of rearward pressure is applied to the plow unit incident to its striking an unyielding object such as a stone or other hard spot, adequate to flex the leaf spring downward and forward this rocks the forward toggle element about the abutment stop and teeters the center pivot of the toggle elements across the dead-center position thereof, thus tripping the toggle arrangement and allowing continued forward motion of the implement to swing the plow shank rearwardly, and upwardly withdrawing the plow unit from its condition of ground embedment.

An important attribute of this invention is that the plow will normally reset itself upon elevating the frame making the normal procedure of stopping and backing up unnecessary.

In a modified form of the over-center toggle mounting, the leaf spring is replaced by a coil spring while a tension link is connected between the plow frame and forward end of the front toggle element so as to initiate the necessary rocking motion of such toggle element incident to endwise compression of the over-center toggle arrangement. In either form of the invention, the basic principle of over-center toggle tripping remains precisely the same.

The provision of a spring-biased over-center toggle mounting such as has briefly been outlined above constitutes the principal object of the invention. Other objects and advantages of the invention, not at this time enumerated, will become readily apparent as the nature of the invention is better understood.

In the accompanying four sheets of drawings forming a part of this specification, several embodiments of the invention have been shown as being operatively applied to a semi-mounted moldboard plow implement. It will be understood, however, that with or without modification as required, the invention is capable of use in connection with plow implements of the trail behind or fully mounted type or, in fact, with a wide variety of implements other than moldboard plows, the only requisite being that such implement be provided with an earthworking tool which is capable of being swung to an out-of-the-way position when it encounters an unyielding object.

DETAIL DESCRIPTION OF THE INVENTION

Figure 1:
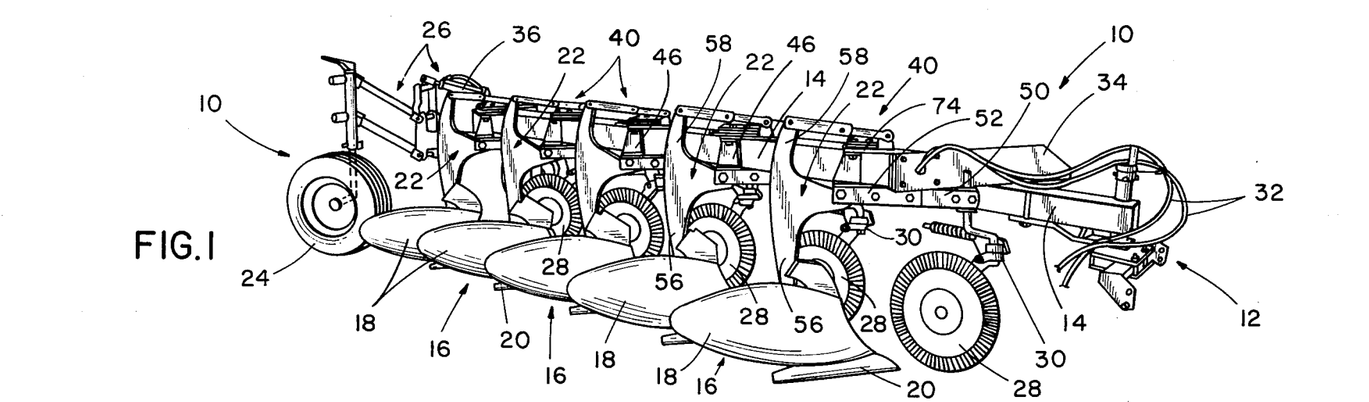
FIG. 1 is a side perspective view of a moldboard plow wherein each plow bottom embodies a spring trip mechanism.

Referring now to the drawings in detail and in particular to FIG. 1, the novel spring trip mechanism of the present invention is disclosed herein as being embodied in a moldboard plow implement 10 of the semi-mounted type and having a conventional hitch structure 12 by means of which the forward end of the implement may be connected in supported relationship to a tractor hitch or the like (not shown). The hitch structure 12 is carried at the forward end of a diagonally extending plow frame 14 which serves to support therebeneath a plurality of plow units or bottoms 16.

Each plow unit 16 embodies the usual moldboard 18 and plow share 20, the moldboard being fixedly secured in the medial region thereof to the lower end of a trip beam 22 which, in effect, constitutes a primary plow shank. According to the invention, each plow unit 16, together with its associated plow shank 22, is capable of swinging movement bodily as a unit about a horizontal axis between a lowered operative earthworking position and a raised inoperative position in a manner and for a purpose that will be made clear presently.

The plow implement 10 further includes the usual rear furrow wheel 24 which serves to tractionally support the rear end of the plow frame 14 while power lift mechanism 26 is provided whereby relative vertical motion between the rear end of the plow frame 14 and the furrow wheel 24 may be effected. A series of disc coulters 28, one for each plow unit 16, are mounted by suitable fittings 30 to the plow frame 14 and assume positions slightly in advance to their respective plow units.

Hydraulic fluid lines 32 leading from the tractor project through a transverse frame member 34 and extend longitudinally along the plow frame 14 to a cylinder 36 associated with the power lift mechanism 26.

The rear furrow wheel 24, the power lift mechanism 26 and the various coulters 28, together with the mountings and fittings therefor, constitute no part of the present invention and, therefore, they have not been illustrated or described in detail herein, the novelty of the present invention residing rather in the nature of a novel spring trip mechanism which is associated with each plow unit 16 and the nature and function of which will now be described in detail and subsequently claimed.

Figure 2:
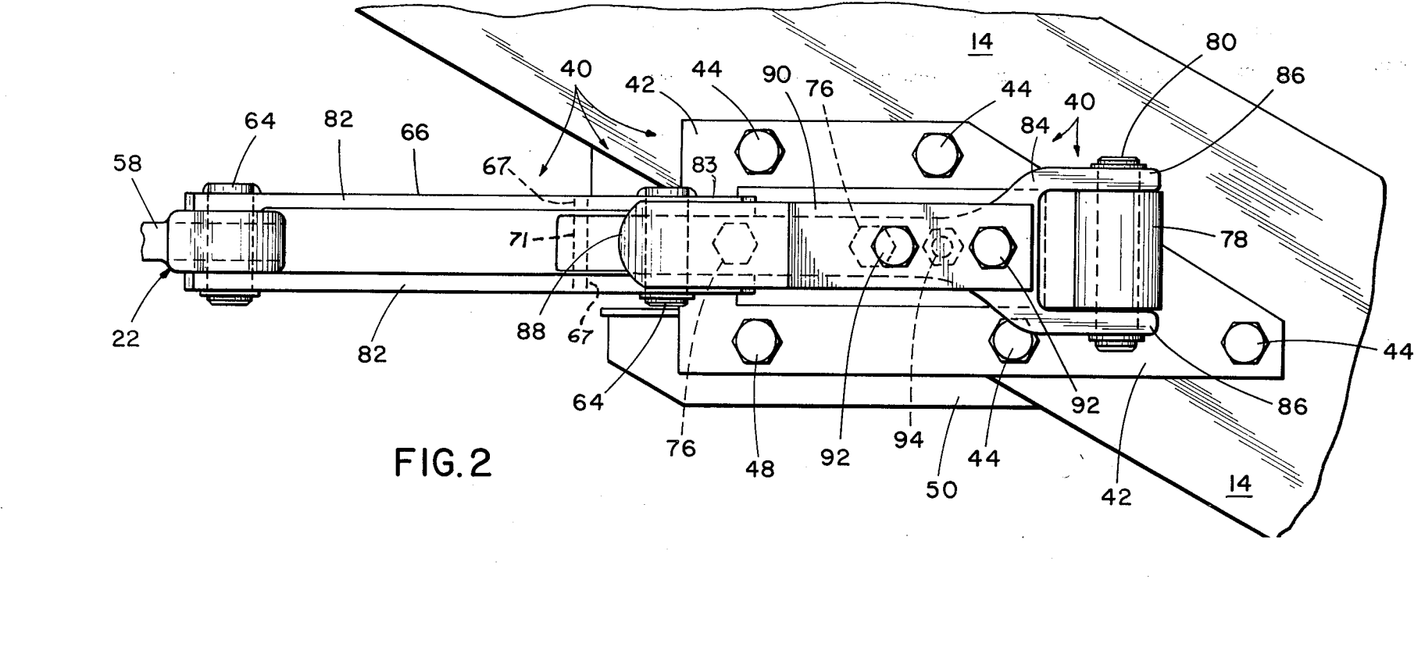
FIG. 2 is an enlarged plan view of one spring trip mechanism.
Figures 3, 5, 6:
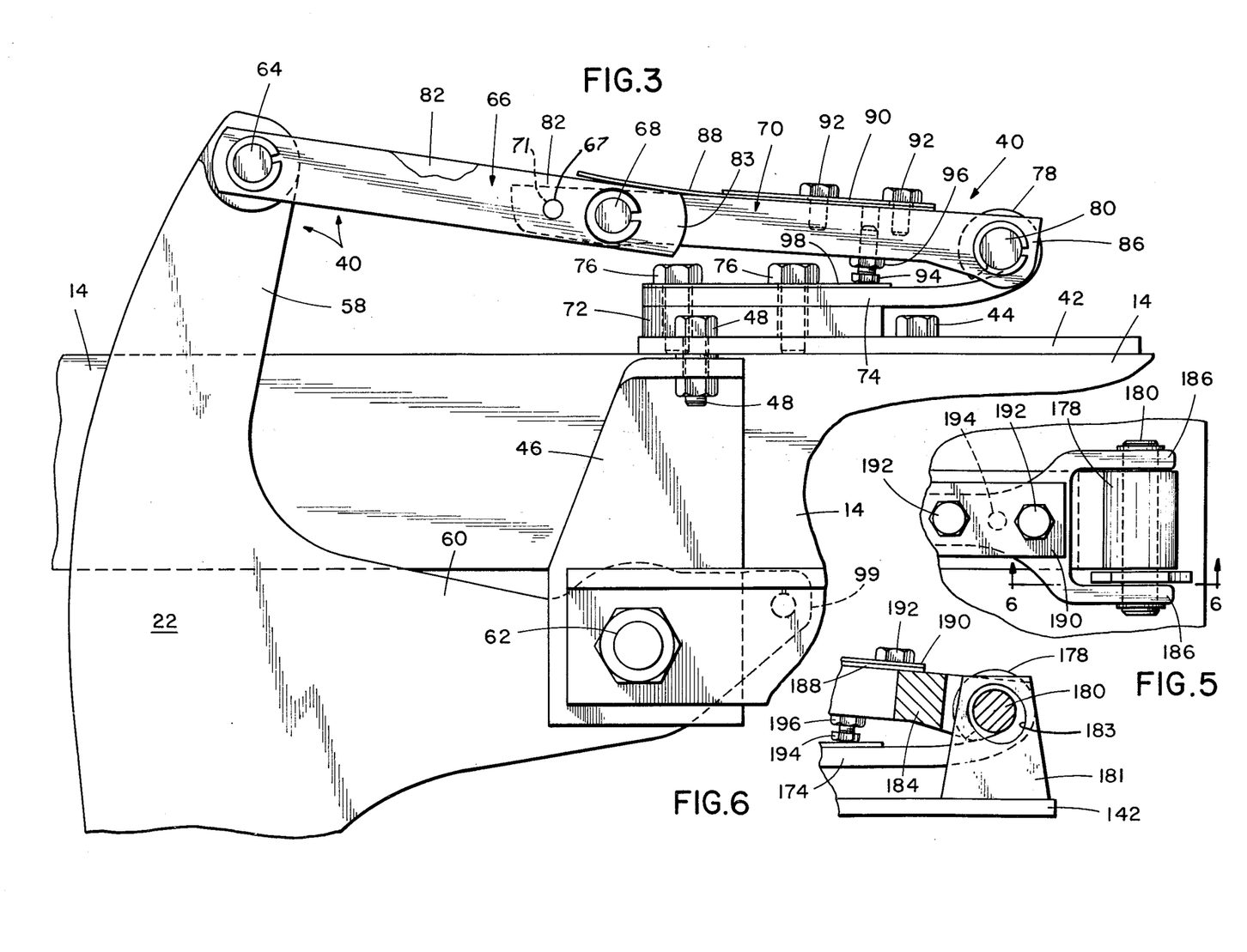
FIG. 3 is a side view of the mechanism of FIG. 2.
FIG. 5 is a plan view of a modified form of the invention.
FIG. 6 is a side view taken along line 6—6 of FIG. 5.
Figure 4:
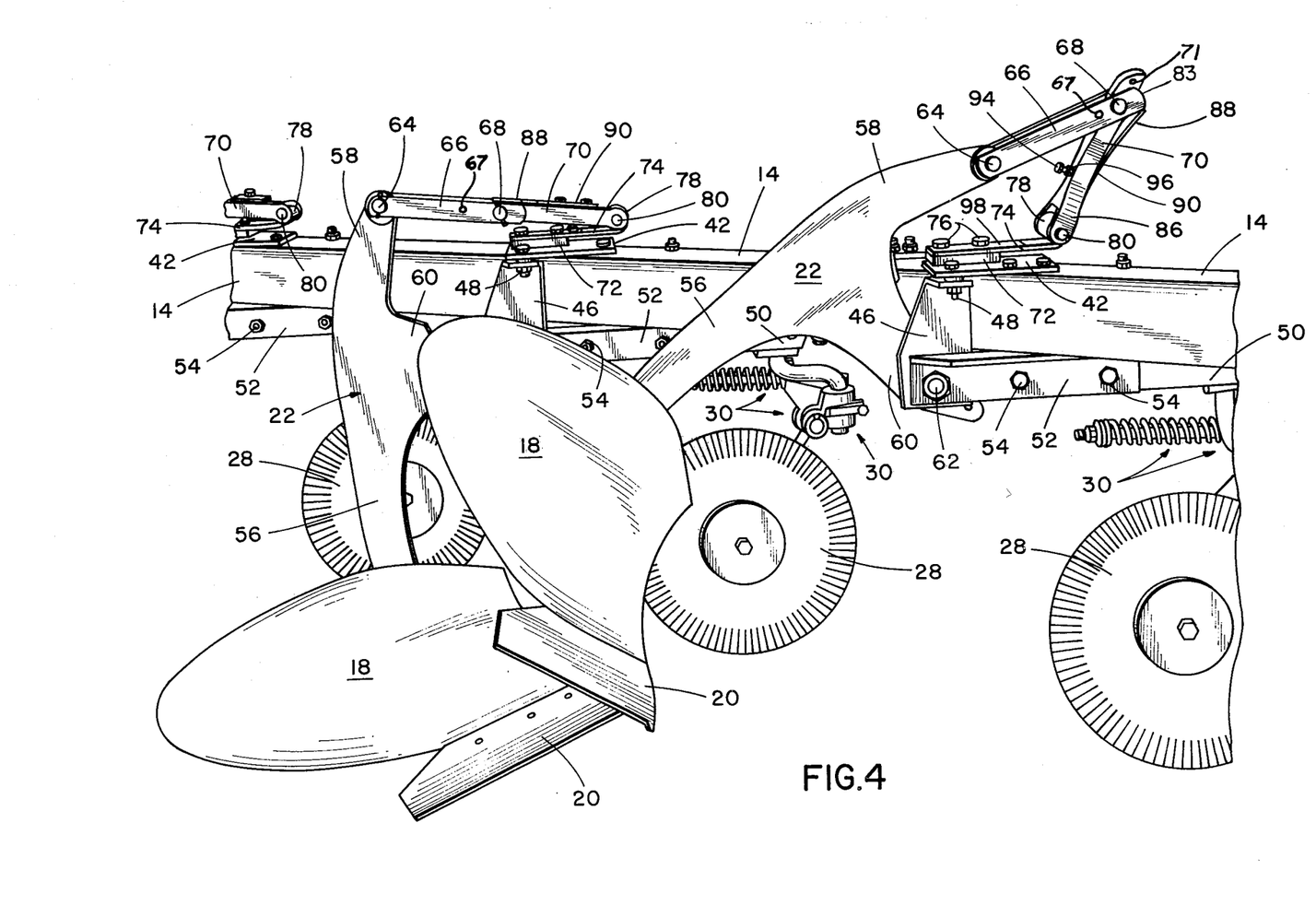
FIG. 4 is an enlarged side perspective view of a portion of a moldboard plow showing one plow bottom in working position and one plow bottom in the tripped position.

Referring now, additionally, to FIGS. 2, 3 and 4, each of the various spring trip mechanisms has been designated in its entirety by the reference numeral 40 and it is adapted normally to maintain its associated plow unit 16 in its earthworking position. These mechanisms are substantially identical in construction and therefore a description of one of them will suffice for them all. Each mechanism 40 involves in its general organization a horizontal trapezoidal anchor plate 42 (FIG. 2) which is secured by bolts 44 to the upper face of the plow frame 14. As best seen in FIGS. 2 and 4, one rear corner region of the anchor plate 42 overhangs one side face of the plow frame 14 and a suspension bracket or standard 46 has its upper end secured by a bolt 48 to the overlying corner region of the anchor plate 42. An undercarriage 50 is fixedly secured to the underneath side of the plow frame 14 and constitutes a support for the aforementioned coulters 28, as well as for an angle member 52 (FIG. 4) which projects across and beneath the plow frame at an angle on the order of 30°, the member 52 being secured by bolts 54 to the undercarriage 50.

The aforementioned trip beam or plow shank 22 is generally in the form of a three arm spider having a lower draw leg 56, and upper lift leg or fixed shank 58 and an intermediate lateral leg 60. The lateral leg 60 has its outer or forward end pivotally connected to the lower end region of the suspension bracket 46 by means of a pivot bolt 62 which projects through both the bracket 46 and the angle member 52. The upper lift leg or fixed shank 58 is pivoted by a pin 64 to the rear end of a rear toggle element 66, the forward end of such element being pivotally connected by a pivot pin 68 to the rear end of a forward toggle element 70. The two toggle elements 66 and 70 are rigid and constitute a floating spring-biased compression toggle arrangement which normally assumes a slightly over-center position against a stop with the toggle elements existing under compression when light or normal earthworking loads are prevalent on the associated plow unit 16. In such over-center position, the toggle elements serve to maintain the plow unit in its operative earthworking position. However, at such time as the plow unit encounters a predetermined degree of resistance to forward movement during its earth-working travel, the floating toggle arrangement is caused to shift its position against the yielding action of the biasing spring and, in so shifting, the relative positional relationship between one of the toggle elements and the stop is altered in such a manner that the toggle elements are carried reversely past the dead-center position, thus tripping the same and allowing the toggle elements to fold, thereby releasing the compression in the elements and allowing the plow unit to swing rearwardly and upwardly.

Accordingly, and as best seen in FIGS. 2 and 3, the aforementioned anchor plate 42 has mounted thereon a block-like pedestal 72, together with a relatively heavy duty toggle-biasing leaf spring 74. The leaf spring and pedestal block are clamped to the anchor block by a pair of bolts 76 which extend through both the leaf spring and block and have their ends threadedly received in the anchor plate 42. The leaf spring 74 overhangs the forward edge of the pedestal 72 and the overhanging portion thereof arches upwardly as clearly shown in FIG. 3 and the extreme outer end thereof is rolled as indicated at 78 and receives therethrough a pin 80 which establishes a floating pivotal connection for the forward end of the toggle element 70.

As best shown in FIG. 2, the rear toggle element 66 is of the parallel dual link type and consists of two parallel links 82, the forwad ends of which straddle the rear end of the toggle link 70 and extend an appreciable distance forwardly beyond the pivot pin 68 as indicated at 83 for a purpose that will be made clear presently. The front toggle element 70 is in the form of a rigid bar, the forward end of which is provided with an integral yoke 84 having yoke arms 86 which straddle the rolled end 78 of the leaf spring 74 and receive the ends of the pivot pin 80. The upper surface of rear toggle element 66 is slightly higher than the corresponding upper surface of front toggle element 70 when the toggle elements are in their dead-center position. A relatively light leaf spring 88 overlies the toggle element 70 and a helper spring 90 overlies the spring 88, the springs being secured in position over the toggle element 70 by bolts 92. The rear end region of the leaf spring 88 bears downwardly against the forwardly extending portion 83 of the toggle element 66 and functions in the manner of a detent to help maintain the toggle arrangement in its slightly over-center position. This over-center position is caused by the difference in height of the upper surfaces of toggle elements 66 and 70.

The over-center position of the toggle arrangement is determined by the provision of a stop member 94. Stop member 94 can be of a fixed length or can be adjustable. An adjustable stop member 94 is illustrated in the form of a bolt which is threadedly received in the forward toggle element 70 and which is adapted to be secured in any selected position of vertical adjustment by means of a lock nut 96. The lower headed end of the bolt 94 is designed for limited sliding engagement with the upper surface of a shim or hardened steel wear plate 98 which overlies the leaf spring 74 and is held in position by means of the aforementioned bolts 76. Shims or hardened steel wear plates 98 can be added or removed to thus provide for adjustment in the abutment stops.

It has been found that for an actual field going plow that the toggle elements were in proper adjustment when the center of pivot pin 68 is 0.24 of an inch below a line through the center of pivot pins 64 and 80. Since this is a constant characteristic of a particular size and design plow, means for assuring proper adjustment is built in the mechanism by forming window apertures 67 and 71 in toggle member 66 and a rearward extension of toggle link 70 respectively. When window aperatures 67 and 71 are aligned the abutment stops are properly aligned. If window aperatures 67 and 71 are not properly aligned proper alignment can be attained by adjusting stop member 94 or by adding or removing shims or hardened steel wear plates 98.

From the above description it will be apparent that because the center of gravity of the plow unit 16 and its associated spider-like shank 22 is disposed rearwardly of the pivot bolt 62, the normal tendency when there is no earthworking load on the plow unit 16 is for the upper leg 58 of the shank 22 to pull the toggle arrangement in tension to its dead center position wherein the toggle elements 66 and 70 are in alignment. However, due to the fact that the forward end of the leg 60 of the shank 22 projects forwardly beyond the pivot bolt 62 as indicated at 99 in FIG. 3, such projecting end bears upwardly against the underneath side of the plow frame 14, thus limiting the extent of counterclockwise swinging movement of the shank 22 and allowing the leaf spring 88 to force the forwardly extending portion 83 of the toggle element 82 downwardly so that the toggle arrangement will be moved to its over-center position wherein the adjustable stop bolt 94 engages the upper surface of the shim or wear plate 98.

During earthworking operations as the plow implement 10 progresses forwardly, normal plowing force acting on the plow in a rearward direction will exert a clockwise component of torque on the plow shank 22 as viewed in FIG. 3 and the extreme upper end of the vertical leg 58 will exert a component of thrust against the over-center toggle arrangement which places the two toggle elements 66 and 70 under compression so that the entire toggle arrangement is constrained to shift to the right while the stop bolt 94 is displaced a short distance on the upper surface of the shim or wear plate 98. This endwise shifting movement of the toggle arrangement bodily to the right is resisted by the overhanging curved portion of the leaf spring 74 which is placed under tension and is thus caused to straighten out, so to speak, to a degree which is commensurate with the applied force on the pivot pin 80.

From the above description it will be apparent that during any given earthworking operation incident to forward movement of the plow implement 10, small changes in the force which is applied to the plow share 20 in a rearward direction will result in varying degrees of endwise shifting movement of the over-center toggle arrangement bodily as a unit to the right as the force is increased and to the left as the force decreases. Such shifting of the toggle arrangement results in varying degrees of upward and downward flexion of the overhanging portion of the leaf spring 74, thus effecting an up and down rocking motion of the forward toggle element 70 about the point of contact between the stop bolt 94 and the shim or wear plate 98.

At such time as the rearward draft load force on the plow share 20 remains below a predetermined minimum, the toggle arrangement will remain in its over-center position and the pivot pin 68 which connects the two toggle elements 66 and 70 will not pass upwardly beyond the common plane which passes through the pivot pins 64 and 80. However, at such time as the draft load force acting on the plow share 20 exceeds such predetermined minimum, as for example when the plow share 20 encounters an unyielding object, the compressional force acting endwise on the toggle arrangement will be of sufficient magnitude that the floating pivot pin 80 will shift downwardly to such an extent that the consequent rocking motion of the toggle element 70 will cause the pivot pin 68 to lie above the common plane of the pivot pins 64 and 80. When such a condition occurs, the over-center condition of the toggle arrangement will be destroyed and the latter will "trip," so to speak, and continued excess force on the plow share 20 will cause the toggle elements 66 and 70 to fold as shown in FIG. 4. During such folding of the toggle elements, the extreme forward arcuate edges of the projecting portions 83 of the parallel toggle links 82 will slide on the underneath surface of the detent leaf spring 88, thus deflecting such spring upwardly so that in the extreme folded condition of the toggle arrangement, the toggle elements 66 and 70 are biased toward a fully folded condition. Such a fully folded condition is incapable of being assumed due to the fact that the rear of plate 42 which is mounted on the plow frame 14 engages the medial leg 60 of the plow shank 22 and the plow unit 16.

Restoration of the plow share 16 to its operative working condition may be effected either by operating the tractor hitch mechanism and/or the hydraulic lift mechanism 26 (FIG. 1) so as to raise the plow frame 14, or in the rare occasion when it is found necessary by backing the plow implement. In the former instance, the weight of the plow unit 16 will be effective to swing the plow shank 22 in a counterclockwise direction as viewed in FIG. 4 until such time as the toggle arrangement straightens out and assumes its dead center position wherein the two toggle elements 66 and 70 become aligned, after which the detent leaf spring 88 will help force the toggle arrangement to its over-center condition with the stop bolt 94 resting on the wear plate 98. In the latter instance, backing of the plow implement 10 will exert a forward thrust on the plow share 20, thus swinging the plow shank 22 in a counterclockwise direction in order to restore the toggle arrangement to its over-center condition.

In FIGS. 5 and 6, a slightly modified form spring trip mechanism 140 is illustrated wherein a stress-inhibiting bracket 181 is incorporated in the mounting for the pivot pin 180 at the forward end of the front toggle element 170. Other than the addition of the bracket 181, the form of spring trip mechanism fragmentarily shown in FIGS. 5 and 6 remain substantially the same as the spring trip mechanism 40 previously described and, therefore, in order to avoid needless repetition of description, similar reference numerals but of a higher order have been applied to the corresponding parts as between the disclosure of FIGS. 5 and 6 on the one hand and FIGS. 2 and 3 on the other hand. Furthermore, in FIGS. 5 and 6, only that portion of the spring trip mechanism in the immediate vicinity of the pivotal connection between the front toggle element 170 and the leaf spring 174 are illustrated.

The bracket 181 is of flat plate-like construction and it is of trapezoidal configuration, the large base thereof being suitably secured in edge-to-plate relationship on the anchor plate 142 as by welding or otherwise. The bracket 181 is formed with a relatively short inclined guide slot 183 therein and through which the pivot pin 180 extends. In order to accommodate the bracket 181, the distance between the yoke arms 186 is slightly greater than the combined width of the rolled portion 178 of the spring 174 and the thickness of the bracket and the latter projects upwardly between one side of the rolled portion 178 and one of the yoke arms 186. The configuration of slot 183 is such that, when the spring trip mechanism 140 is in an untripped equilibrium position as shown in FIG. 6, spring 174 and pin 180 are free to deflect downwardly but are restricted in their upward movement. The function of the bracket 181 and slot 183 is to prevent spring 174 from being upwardly overstressed or ruptured by the rebound forces encountered upon tripping caused by the release of stored loads.

Figure 7:
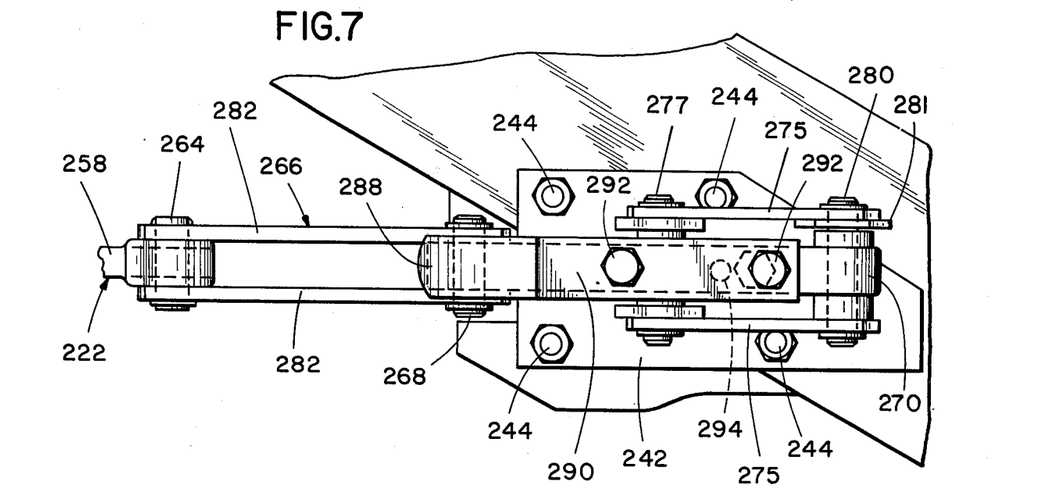
FIG. 7 is a plan view of another modified form of the invention.
Figure 8:
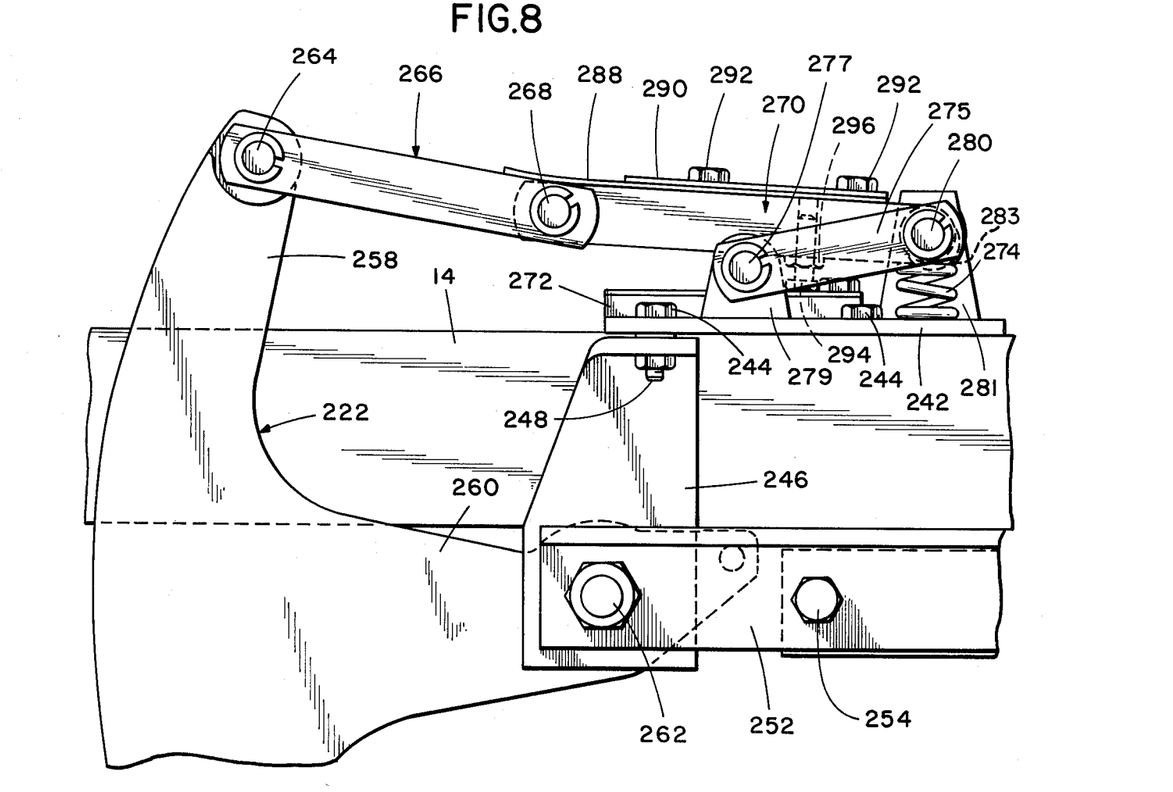
FIG. 8 is a side view of the modified form of the invention shown in FIG. 7.

In FIGS. 7 and 8 a further modified form of spring trip mechanism 240 is disclosed. In this form of the invention the various parts remain substantially the same as in the form shown in FIGS. 5 and 6 with the exception that the leaf spring 174 has been dispensed with and, in its place, there has been substituted a helical compression spring 274 and a dual tension link 275, such spring and link affording substantially the same toggle action as does the leaf spring 174. Again, due to the similarity of parts as between the disclosures of FIGS. 5 and 6 and the disclosures of FIGS. 7 and 8, similar reference numerals but of a still higher order have been applied to the corresponding parts in order to avoid needless description.

In this latter modified form of spring trip mechanism, and in addition to the provision of the helical coil spring 224, the pivot pin 280 at the forward end of the front toggle element 270 is connected by the dual tension link 275 to a pivot pin 277 which is carried near the upper end of a pair of standards 279 which straddle the forward toggle element 270 and are secured to the anchor plate 242. The pivot pin 280 bears against the upper end of the helical compression spring 274 and the lower end of such spring is fixedly secured as by welding to the upper face of the anchor plate 242. A bracket 281, similar to the bracket 181 of the form of the invention shown in FIGS. 5 and 6, is mounted on the anchor plate 242 and is provided with an inclined slot 283 which is similar to the slot 183 and is designed for the same purpose. Otherwise the spring trip mechanism of FIGS. 7 and 8 remains substantially the same as the spring trip mechanism of FIGS. 5 and 6. It should be noted that it is contemplated that spring 274 could be in the form of a stack of Belleville washers.

In the operation of the spring trip mechanism 240, when the plow share encounters a non-yielding object, or the rearward force on such plow share otherwise exceeds a predetermined maximum, the endwise thrust which is applied to the toggle mechanism (which includes the toggle elements 266 and 270) will apply clockwise torque to the link 275 as viewed in FIG. 8, thus forcing the pivot pin 280 downwardly against the yielding action of the compression spring 274. Such lowering of the forward end of the toggle element 270 will rock this toggle element on the stop member 294 in the manner previously described in connection with the toggle elements 66 and 70 until the general plane of the two pivot pins 280 and 264 falls below the pivot pin 268, at which time the toggle arrangement will trip and allow the plow unit 16 to swing upwardly, thus folding the toggle arrangement in a manner similar to that described in connection with the toggle links 66 and 70.

The invention is not to be limited to the exact arrangement of parts shown in the accompanying drawings or described in this specification as various changes in the details of construction may be resorted to without departing from the spirit of the invention. For example, under certain circumstances it may be found desirable to dispense with the tension link 275 and the supporting standards 279 and rely solely upon the guiding influence of the inclined slot 283 in the bracket 281 to guide the pivot pin 280 in its oscillatory up and down movement incident to the varying compression which is applied to the over-center toggle arrangement by the plow shank 222 as the latter encounters varying earth resistance. Therefore, only insofar as the invention has particularly been pointed out in the accompanying claims is the same to be limited.

What is claimed is:

1. The combination with an earthworking implement having a frame and an earthworking tool pivoted to the frame for swinging movement about a transverse axis between a forward lower earthworking position and a rearward and upwardly inoperative position, the improvement which comprises an over-center toggle mechanism for maintaining the tool in its earthworking position under the influence of normal rearward reaction pressure against the tool during forward movement of the implement and for releasing the tool for rearward and upwardly swinging movement when said reaction pressure exceeds a predetermined maximum, said mechanism comprising a toggle arrangement including a pair of rigid toggle elements pivotally connected together at their inner ends to provide a center pivot, a first pivot pin connecting the outer end of one of said toggle elements to said tool, a second resiliently mounted shiftable pivot pin connecting the outer end of the other toggle element to the frame, cooperating engageable abutments normally effective between a medial region of the other toggle element and the frame about which said shiftable pivot pin rocks, means yeildingly biasing said resiliently mounted shiftable pivot pin to a position wherein said abutments are engaged when said toggle elements are in a slightly over-center position such that said center pivot is offset to one side of the line connecting said first pivot pin and said resiliently mounted shiftable pivot pin, said toggle elements, when in said over-center position, being responsive to endwise compressional force exerted thereagainst by said first pivot pin under normal tool reaction pressure to shift the toggle arrangement bodily as a unit endwise, thus rocking and shifting the resiliently mounted pivot pin so that said line approaches a dead-center position at which said line crosses the center pivot, said resilient means having a spring constant such that said line does not cross said center pivot so long as said reaction pressure does not exceed the predetermined maximum, and being responsive when said reaction pressure exceeds the predetermined maximum to shift said resiliently mounted pivot sufficiently to move said line past said dead-center position to the other side of said center pivot pin to thereby trip the toggle arrangement and release said tool for rearward and upwardly swinging movement.

2. The combination set forth in claim 1, wherein said yieldable biasing means for the resiliently mounted shiftable pivot pin comprises a flexible leaf spring having a base portion and an outer end, said base portion effectively secured to the frame, said outer end of said leaf spring serving to support said resiliently mounted shiftable pivot pin.

3. The combination set forth in claim 1, wherein said tool is provided with a fixed shank which projects upwardly, the first pivot pin is carried at the upper end of said shank, the yieldable biasing means for the resiliently mounted shiftable pivot pin comprises a flexible leaf spring having its base effectively secured to the upper face of the frame and having an outer portion which is inclined generally upwardly above the level of said upper face, the outer end of said leaf spring serving to support said resiliently mounted shiftable pivot pin.

4. The invention as set forth in claim 1, wherein means are provided for adjusting said cooperating engageable abutments.

5. The combination set forth in claim 3, wherein said toggle elements include front and rear elements which closely overlie the frame when the toggle arrangement is in its over-center position, the rear end of the rear element is connected to the first pivot pin, the front end of the front element is connected to the resiliently mounted shiftable pivot pin, and the outer portion of the leaf spring projects forwardly and, in the main, underlies the front toggle element.

6. The combination set forth in claim 5, wherein the forward end of said leaf spring is rolled in cylindrical fashion to provide a support for the resiliently mounted shiftable pivot pin, and the front end of the front toggle element is provided with a yoke having yoke arms which straddle the rolled end of the leaf spring and are attached to the opposite ends of the resiliently mounted shiftable pivot pin.

7. The combination set forth in claim 6, wherein said resiliently mounted shiftable pivot pin is guided in an inclined slot which is formed in an upstanding bracket provided on said frame the cooperation between said resiliently mounted shiftable pivot pin and inclined slot function to prevent overstressing of said leaf spring caused by tripping.

8. The combination set forth in claim 6, wherein said cooperating engageable abutments embody a depending stop member on the medial region of the front toggle element and which is engageable with a surface area that is fixed relative to said frame.

9. The combination set forth in claim 8, wherein said depending stop member includes adjusting means that function to vary the distance that it projects from said front toggle element received in a threaded bore in the underneath side of the front toggle element.

10. The invention as set forth in claim 8 wherein means are provided for adjusting said cooperating engageable abutments by adding and removing shims to raise and lower said surface area.

11. The combination set forth in claim 8, wherein the upper surfaces of the toggle elements are on different levels when said toggle elements are in their dead-center position, a detent leaf spring is fixedly secured to the lower level upper surface and overhangs the higher level upper surface, thus overlying the center pivot between the toggle elements and serving normally to urge the toggle elements to their over-center positions.

12. The combination set forth in claim 8, wherein a pedestal block is interposed between the base portion of the leaf spring and the upper surface of the frame, and the forward region of the leaf spring overhangs such pedestal block in a forward direction.

13. The combination set forth in claim 1, wherein said tool is provided with a fixed shank which projects upwardly above the level of the frame, the first pivot pin is carried at the upper end of said shank, and the yieldable biasing means for the resiliently mounted shiftable pivot pin comprises spring means exerting a pressure between the frame and said resiliently mounted shiftable pivot pin.

14. The combination set forth in claim 13, wherein a tension link is pivotally connected to both said resiliently mounted shiftable pivot pin and the frame.

15. The combination set forth in claim 13, wherein said cooperating abutments embody an adjusting screw which is threadedly received in a threaded bore in the underneath side of said other toggle link and which is engageable with the upper surface of the frame.

16. In an earthworking implement, in combination, a frame provided with an under-carriage, a spider-like tool shank having a lower leg, an upper leg and an intermediate leg, an earthworking tool fixedly secured to said lower leg, means pivotally connecting said intermediate leg to the under-carriage for swinging movement of the shank between a lowered position wherein the tool is in its earthworking position and a raised position wherein the tool is in a raised inoperative position, an over-center toggle mechanism for maintaining said shank in its lowered position under the influence of normal rearward reaction pressure on the tool during forward movement of the implement and for releasing the tool for rearward and upwardly swinging movement when the reaction pressure exceeds a predetermined maximum, said mechanism comprising a toggle arrangement including front and rear rigid toggle elements pivotally connected to provide a center pivot, a first pivot pin connecting the rear end of the rear toggle element to the upper end of the upper leg of the shank, a flexible leaf spring having its rear end fixedly secured to the frame and projecting forwardly and upwardly and terminating in a rolled end, a second pivot pin encompassed by said rolled end, the forward end of said front toggle element being pivoted to said second pivot pin such that the forward end of said front toggle element is resiliently mounted on said frame, interengaging abutments on the front toggle element and spring and effective when in engagement to establish a point about which said forward end of said front toggle element rocks, said leaf spring yieldingly biasing the second pivot pin to a position wherein the abutments are engaged when the toggle elements assume a slightly over-center position, in which said center pivot is offset to one side of a line connecting said first pivot pin and said second pivot pin, and are responsive to endwise compressional force exerted thereagainst by the first pivot pin under normal tool reaction pressure to shift the toggle arrangement bodily endwise, thus rocking the forward end of said front toggle element and shifting the resiliently mounted forward end of said front toggle element so that said line approaches a dead-center position at which said line crosses the center pivot, said flexible leaf spring having a spring constant such that said line does not cross said center pivot so long as said reaction pressure does not exceed the predetermined maximum, and being responsive when said pressure exceeds the predetermined maximum to shift said resiliently mounted forward end of said front toggle element sufficiently to move said line past said dead-center position to the other side of said center pivot pin and trip the toggle arrangement.

17. In an earthworking implement, the combination set forth in claim 16, wherein said leaf spring directly underlies the front toggle element, and a pedestal block is interposed between the rear end of the leaf spring and the frame, the forward region of the leaf spring overhanging said pedestal block in spaced relationship above the level of the frame.

18. In an earthworking implement, the combination set forth in claim 16, wherein one of said interengaging abutments comprises a hardened steel wear plate mounted on the leaf spring.

19. The combination with an earthworking implement having a frame and an earthworking tool pivoted to the frame for swinging movement about a transverse axis between a forward lower earthworking position and a rearward and upwardly inoperative position, the improvement which comprises an over-center toggle mechanism for maintaining the tool in its earthworking position under the influence of normal rearward reaction pressure against the tool during forward movement of the implement and for releasing the tool for rearward and upwardly swinging movement when said reaction pressure exceeds a predetermined maximum, said mechanism comprising a toggle arrangement including a pair of rigid toggle elements pivotally connected together at their inner ends to provide a center pivot, first and second pivot pins connecting the outer ends of said toggle element to said tool and frame, resilient mounting means associated with one of said pivot pins such that one of said pivot pins is resiliently shiftable relative to said tool or frame, cooperating engageable abutments normally effective between a medial region of the toggle element associated with the resiliently mounted shiftable pivot pin and the tool or frame around which said resiliently mounted shiftable pivot pin rocks relative to the tool or frame, said resiliently mounting means yieldingly biasing said resiliently mounted shiftable pivot pin to a position wherein said abutments are engaged when said toggle elements are in a slightly over-center position such that said center pivot pin is offset to one side of the line connecting said first pivot pin and said second pivot pin, said toggle elements, when in said over-center position, being responsive to endwise compressional force thereagainst by one of said pivot pins under normal tool reaction pressure to thus cause rocking of said resiliently mounted shiftable pivot pin and shifting the resiliently mounted shiftable pivot pin so that said line approaches the dead-center position at which said line crosses said center pivot, said resilient mounting means having a spring constant such that said line does not cross said center pivot so long as said reaction pressure does not exceed the predetermined maximum, and being responsive when said reaction pressure exceeds the predetermined maximum to shift said resiliently mounted shiftable pivot pin sufficiently to move said line past said dead-center position to the other side of said center pivot to thereby trip the toggle arrangement and release said tool for rearward and upwardly swinging movement.

20. The invention as set forth in claim 19 wherein means are provided for adjusting said cooperating engageable abutments.

21. The invention as set forth in claim 20 wherein means are provided for visually checking for proper adjustment of said cooperating engageable abutments.

22. The invention as set forth in claim 21 wherein said means for checking for proper adjustment comprises window apertures formed in said pair of rigid toggle elements.

* * * * *